United States Patent

Nishio et al.

[11] Patent Number: 5,914,825
[45] Date of Patent: Jun. 22, 1999

[54] REFLECTOR FOR DISPLAY

[75] Inventors: Toshikazu Nishio; Hisanori Ishida, both of Tokyo-To, Japan

[73] Assignee: Dai Nippon Printing Co., Ltd., Tokyo, Japan

[21] Appl. No.: 08/933,018

[22] Filed: Sep. 18, 1997

[30] Foreign Application Priority Data

Sep. 20, 1996 [JP] Japan ................................. 8-269087

[51] Int. Cl.⁶ ............................ G02B 5/08; G02B 27/00; G03B 21/60
[52] U.S. Cl. ...................... 359/851; 359/459; 359/593; 359/627
[58] Field of Search .................................. 359/459, 599, 359/615, 627, 838, 850, 851, 592, 593, 597

[56] References Cited

U.S. PATENT DOCUMENTS

| | | | |
|---|---|---|---|
| 3,718,078 | 2/1973 | Plummer | 359/459 |
| 4,298,249 | 11/1981 | Gloor et al. | |
| 4,756,603 | 7/1988 | Ohtani | 359/459 |
| 4,911,529 | 3/1990 | Van de Ven | 359/459 |
| 5,299,061 | 3/1994 | Wakatake | 359/599 |
| 5,351,153 | 9/1994 | Wakatake | 359/599 |
| 5,598,280 | 1/1997 | Nishio et al. | |
| 5,600,455 | 2/1997 | Ishikawa et al. | 349/57 |

FOREIGN PATENT DOCUMENTS

| | | | |
|---|---|---|---|
| 56-157310 | 4/1981 | Japan . | |
| 58-184939 | 10/1983 | Japan | 359/599 |
| 5169015 | 9/1993 | Japan . | |

*Primary Examiner*—Ricky D. Shafer
*Attorney, Agent, or Firm*—Morgan & Finnegan LLP

[57] ABSTRACT

In a reflector for a display to be placed on the back surface of a reflection-type display, the section of the reflector is made serrated so that the shape of the serration will be an isosceles or scalene triangle, and, at the same time, the serrated reflecting surface is finely roughened. The roughness of the finely roughened reflecting surface is so controlled that the center line average height Ra will be 1 micrometer or more and 6 micrometers or less and that the ten-point average height Rz will be 1 micrometer or more and 10 micrometers or less. By this, images displayed on a display into which the reflector is incorporated can be observed without being obstructed by surface-reflected light, and also brightly observed in a wide angle.

6 Claims, 5 Drawing Sheets

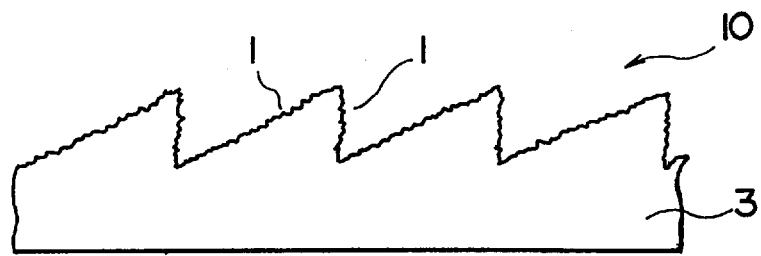
F I G . 1
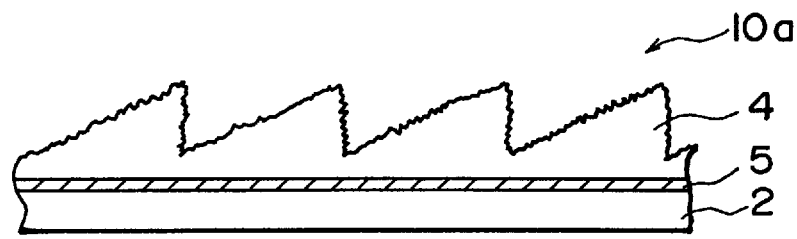
F I G . 2
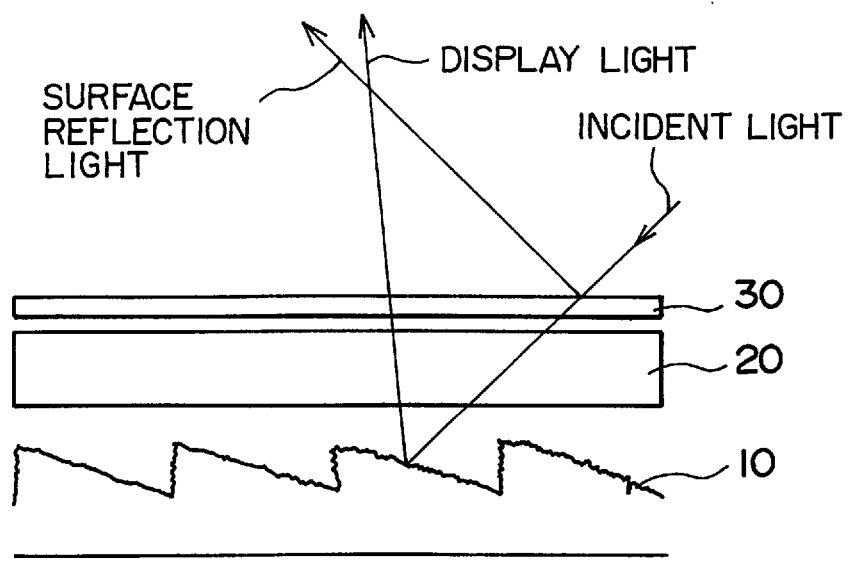
F I G . 3

REFLECTOR FOR DISPLAY

BACKGROUND OF THE INVENTION

1. Field of the Invention

The present invention relates to a reflector which is placed on the back surface of a reflection-type display utilizing external light as a light source for lighting, such as a reflection-type liquid crystal display.

2. Related Art

Heretofore, there have been known reflection-type displays which have no exclusive light source but utilize external light as a light source, such as reflection-type liquid crystal displays. Unlike transmission-type displays, the reflection-type displays utilize light on the observation side, which is allowed to reflect on a reflector placed on the back surface of their display elements. Since the reflection-type displays effectively utilize external light, they are advantageous in that no electric power is required for a light source and that images displayed can be brightly observed when external light is bright.

However, a conventional reflector which is placed on the back surface of a display element such as a liquid crystal display element when a reflection-type display is fabricated has not necessarily been satisfactory in properties. FIG. 6 shows one example of the reflection-type liquid crystal display. This display is composed of a liquid crystal display element 20, a surfacing material 30 having antiglaring properties or antireflection effect, which is provided on the observation-side surface of the liquid crystal display element 20 so as to prevent this surface from glaring, and a matted reflector 40 having a matted plane reflecting surface with fine roughness, provided on the back surface of the liquid crystal display element 20. As the matted reflector 40 is used a reflector in which a layer of a metal such as aluminum is provided, by means of vacuum deposition or the like, as a light-reflecting layer on a matted polyethylene terephthalate film whose surface itself is matted, or on a polyethylene terephthalate film having thereon a matted layer formed by applying a coating liquid containing fine particles.

However, as can also be noticed from FIG. 6, although incident light reflected on the reflector serves as display light (reflected light) useful for displaying images, a part of the incident light reflects on the surface of the surfacing material or of the liquid crystal display element, and becomes useless surface-reflected light. Moreover, the reflecting surface of the reflector and that of the surfacing material are parallel with each other, so that the angle α of reflection of the display light is equal to the angle β of reflection of the surface-reflected light. The display light and the surface-reflected light thus become parallel with each other. It is noted that the angle of reflection herein does not mean an angle of reflection formed by light with a surface on which the light actually reflects, but means an apparent angle of reflection formed by light with the image-displaying surface of a display. Therefore, images displayed on the image-displaying surface can be most brightly seen when observed from the direction in which display light travels. However, the surface-reflected light also travels in this direction, so that the external light source is seen on the image-displaying surface due to the surface-reflected light. Therefore, the image-displaying surface is most glaring when observed from this direction. Thus, the direction from which images can be observed most brightly is the direction from which the images cannot be observed without difficulty due to the surface-reflected light with highest intensity.

The above problem can be solved when the angle of reflection of display light and that of reflection of surface-reflected light are made different from each other. This can be attained, for example, by a reflection-type display shown in FIG. 7. The reflection-type display shown in this figure is the same as the reflection-type display shown in FIG. 6 except that the matted reflector 40 is replaced with a serrated reflector 50. Namely, this reflection-type display is composed of a liquid crystal display element 20, a surfacing material 30 having antiglaring properties or antireflection effect, which is provided on the observation-side surface of the liquid crystal display element 20 so as to prevent this surface from glaring, and a reflector 50 having a reflecting surface whose cross section is serrated, the shape of the serration being a scalene triangle, provided on the back surface of the liquid crystal display element 20. On the reflecting surface of the reflector 50, a light-reflecting layer is formed by, for example, vacuum-depositing a metal such as aluminum.

As can also be understood from FIG. 7, when the serrated reflector 50 is used, the reflecting surface of the reflector is not parallel with the image-displaying surface of the display. As a result, the angle α1 of reflection of display light and the angle β1 of reflection of surface-reflected light become different from each other, and the display light and the surface-reflected light travel in different directions. However, the reflecting surface of the serrated reflector 50 is a mirror surface, so that light does not diffuse on the surface of the reflector at all. Therefore, such a problem is brought about that the angle of directions in which images displayed can be brightly observed is limited to an extremely narrow range depending upon the direction of external light.

FIG. 8 is a characteristic diagram of luminance distribution by angle (the direction in which reflected light mainly travels is taken as angle 0*), conceptually showing the luminance distribution of reflected light in reflection-type display shown in FIG. 6 and that of reflected light in the reflection-type display shown in FIG. 7. The luminance distribution 64 obtained when the matted reflector 40 is used is broad, and this shows that acceptable brightness can be obtained in a wide angle. On the other hand, with respect to the luminance distribution 65 obtained when the serrated reflector is used, the peak luminance is greater but the luminance distribution is narrower than those obtained when the matted reflector 40 is used. This means that the luminance lowers drastically with a slight change in the direction of observation and that the optimum visual angle is narrow.

SUMMARY OF THE INVENTION

An object of the present invention is therefore to solve the aforementioned problems in the prior art, thereby providing such a reflector that, when it is used for a display, images displayed on the display can be observed without being obstructed by surface-reflected light, and also brightly observed in a wide angle of view.

Accordingly, in a reflector of the present invention to be placed on the back surface of a reflection-type display, the cross section of the reflector is made serrated so that the shape of the serration will be an isosceles or scalene triangle, and, at the same time, the serrated reflecting surface is finely roughened. By making the cross section of the reflector serrated, the direction in which display light travels and the direction in which surface-reflected light travels are made different from each other. Moreover, by finely roughening the serrated reflecting surface, the display light is allowed to travel in broadened directions, thereby increasing the range of angle in which the images displayed can be brightly observed. Thus, the reflector of the present invention was devised to obtain a reflection-type display wherein images displayed thereon can be well observed. Further, the fine roughness on the serrated reflecting surface is so controlled that center line average height Ra will be 1 micrometer or more and 6 micrometers or less and that the ten-point average height Rz will be 1 micrometer or more and 10 micrometers or less. By so controlling the roughness, the reflected light can scatter at proper angles.

BRIEF DESCRIPTION OF THE DRAWINGS

In the drawings,

FIG. 1 is a sectional view of one embodiment of a reflector (single-layer) of the present invention;

FIG. 2 is a sectional view of another embodiment of a reflector (multi-layered) of the present invention;

FIG. 3 is an illustrative view of one example of the combination of a reflection-type liquid crystal display element and a reflector of the present invention;

DETAILED DESCRIPTION OF THE INVENTION

Figure 4:
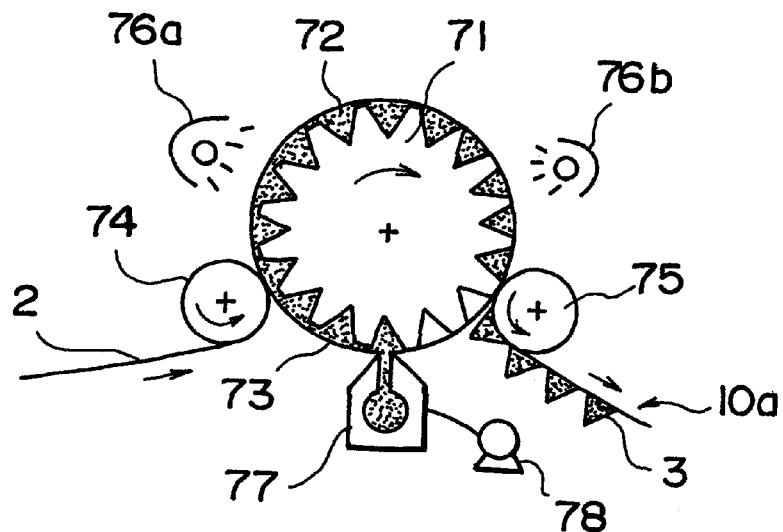
FIG. 4 is a diagrammatic view showing one example of an apparatus which can be used for producing a reflector of the present invention.

By referring now to the accompanying drawings, reflectors of the present invention will be described in detail.

A sectional view of a single-layer reflector, one embodiment of the present invention, is shown in FIG. 1, and that of a multi-layered reflector, another embodiment of the present invention, is shown in FIG. 2. In FIGS. 1 and 2, the surface of the reflector 10 or 10a on the upper side in the figure is a serrated reflecting surface 1 having fine roughness.

The shape of the serration in the reflectors of the present invention may be either a scalene triangle as shown in the figures or an isosceles triangle. Further, one side of the triangle may be either perpendicular to the image-displaying surface of a display as shown in the figures, or non-perpendicular to the same. These are to be properly selected depending upon the relation between the position of external light and that of observation in the circumstances under which a display comprising the reflector is used. Further, the size of the serration (height, pitch, etc.) is properly selected depending upon the fineness of dots with which an image displayed on a display used is formed. In order to use the reflector for a liquid crystal display on which images are displayed with fine dots, the pitch of the repeating serrations is made, for example, as small as approximately 10 to 200 micrometers. On the other hand, in order to use the reflector for a large-sized display such as a signboard, it is possible to make the pitch as large as approximately 1 mm to 1 cm.

The reflectors of the present invention are characterized in that the serrated reflecting surfaces thereof have fine roughness. The degree of the fine roughness can also be properly selected depending upon the relation between the position of external light and that of observation in the circumstances under which a display comprising the reflector is used. The degree of the fine roughness is preferably such that the center line average height Ra is 1 micrometer or more and 6 micrometers or less and that the ten-point average height Rz is 1 micrometer or more and 10 micrometers or less. By so controlling the roughness, it is possible to obtain a reflector which can reflect light at angles which are neither too wide nor too narrow. An angle at which the maximum reflectance becomes half (half-value angle) can be used, as an index, for evaluating reflectors. The maximum reflectance is preferably 10% or more, and the half-value angle is preferably 20° or more.

The reflector of the present invention may be of a single-layer structure as shown in FIG. 1 or of a multi-layered structure as shown in FIG. 2. The single-layer reflector 10 as shown in FIG. 1 is composed of a base 3 having irregularities. The multi-layered reflector 10a as shown in FIG. 2 is composed of a substrate sheet 2, and a layer 4 having irregularities which is laminated on the substrate sheet 2 through an intermediate layer 5. The intermediate layer 5 could be omitted.

On the serrated reflecting surface having fine roughness, it is preferable to provide, as a light-reflecting layer, a layer of a metal such as aluminum, chromium, gold or silver by means of vacuum deposition, plating, or the like. However, such a light-reflecting layer is not shown in the figures. Further, the light-reflecting layer is not counted as one layer even if it is present.

In general, the reflector is in the form of a plate, and has a thickness of approximately 20 to 1,000 micrometers. The surface of the reflector can be made into rectangular, circular or any other shape depending upon the shape of the image-displaying surface of a display. Moreover, a three-dimensional reflector having irregularities on the back or side surface thereof is also acceptable depending upon the use of a display into which the reflector is incorporated.

There is no particular limitation on materials from which the base 3 or layer 4 having a serrated reflecting surface with fine roughness is made, and any transparent or opaque, colored or non-colored material can be used. Examples of such materials include thermoplastic resins such as polyester resins, for example, polyethylene terephthalate and polybutylene terephthalate, acrylic resins, for example, polymethyl methacrylate, polycarbonate resins, polystyrene resins and polymethylpentene resins; thermosetting resins such as epoxy resins and urethane resins; and those resins which are obtained by hardening ionizing-radiation-curable resins made from oligomers and/or monomers such as acrylate monomer, for example, polyester acrylate, urethane acrylate and epoxy acrylate, by applying thereto an ionizing radiation such as ultraviolet light or electron beam. Further, glass, ceramics, and the like can also be used.

Further, there is no particular limitation also on materials for the substrate sheet 2 to be used in the multi-layered reflector 10a shown in FIG. 2, and any transparent or opaque, colored or non-colored material can be used. Examples of such materials include sheets of polyester resins such as polyethylene terephthalate and polybutylene terephthalate, acrylic resins such as polymethyl methacrylate, polycarbonate resins and polystyrene resins. The proper thickness of the sheet varies depending upon the method for forming the layer having irregularity. In general, however, the thickness is approximately 10 to 1,000 micrometers.

Any material can be used for forming the intermediate layer 5 which can serve as a primer layer or the like, and those resins and primers which are used in conventionally-known adhesion-promoting treatments can be used.

A single-layer reflector as shown in FIG. 1 can be produced by a known method for hot-pressing a thermoplastic resin, as disclosed, for example, in Japanese Patent Laid-Open Publication No. 157310/1981, or by an injection molding method in which irregularities are formed on a reflecting surface by using a mold having irregularities complementary to the desired irregularities. In addition, a single-layer reflector can also be made by cast-molding a resin which is curable by ultraviolet light or heat.

In order to obtain a multi-layered reflector as shown in FIG. 2, it is possible to employ, for example, a method disclosed in Japanese Patent Laid-Open Publication No. 169015/1993. This method is as follows: indentations on an indented roll, the indentations (precisely, the irregularities) being complementary to the desired irregularities to be formed on a reflecting surface, are filled with an ionizing-radiation-curable resin liquid; a transparent substrate sheet is overlaid on this roll; to this is applied an ionizing radiation such as ultraviolet light or electron beam from the transparent substrate sheet side to harden the ionizing-radiation-curable resin liquid (when the indented roll is made from glass or the like and transparent, an opaque substrate sheet can also be used instead of the transparent substrate sheet, and, in this case, an ionizing radiation is applied from the inside of the indented roll); and the substrate sheet is then separated from the indented roll together with the hardened resin, thereby obtaining a reflector of the present invention, having the substrate sheet whose reflecting surface has desired serrated irregularities with fine roughness formed by the hardened resin.

FIG. 4 is a diagrammatic view (side view) showing one example of an apparatus which can be used in the above-described production method using an ionizing-radiation-curable resin.

In FIG. 4, the numeral 71 indicates an indented roll which has indentations 72 complementary to the irregularities to be formed on a reflecting surface and which rotates on an axis in the direction shown by an arrow; and the numeral 73 indicates an ionizing-radiation-curable resin liquid. A press roll 74 is provided in order to bring a substrate sheet 2 into contact with the indented roll 71. The reference numeral 75 indicates a separation roller; and the reference numerals 76*a* and 76*b* are ionizing-radiation irradiators which are used for hardening the ionizing-radiation-curable resin liquid. The ionizing-radiation-curable resin liquid is delivered through a coating nozzle 77. The reference 78 indicates a pump by which the resin liquid is fed to the coating nozzle 77. The reference numeral 3 indicates a layer having irregularities formed as a hardened product of the ionizing-radiation-curable resin liquid, which layer will be a serrated reflecting surface with fine roughness of the substrate sheet 2. The numeral 10*a* indicates a reflector.

A multi-layered reflector 10*a* is produced by the apparatus shown in FIG. 4 in the following manner: a substrate sheet 2 is brought into pressure contact with an ionizing-radiation-curable resin liquid 73 on the indented roll 71 by the press roll 74; while the substrate sheet 2 is carried by keeping it in contact with the indented roll 71, it is irradiated with an ionizing radiation by the ionizing-radiation irradiators 76*a* and 76*b*, whereby the ionizing-radiation-curable resin liquid 73 is hardened and adhered to the substrate sheet 2; and the substrate sheet 2 is then separated from the indented roll 71 by the separation roller 75. Thus, a multi-layered reflector 10*a* having, on the substrate sheet 2, a layer 3 having irregularities formed by the hardened product of the ionizing-radiation-curable resin liquid can be obtained.

In the case where a transparent substrate sheet is used as the substrate sheet in the above-described production method, a sheet of a polyester resin such as polyethylene terephthalate or polybutylene terephthalate, or the like can be used. The thickness of the substrate sheet is decided by taking working properties such as handling properties into consideration. In general, however, the thickness is approximately 10 to 1,000 micrometers.

By the above-described method, a reflector as shown in FIG. 2, containing, on the substrate sheet 2, the layer 3 having irregularities which will be a serrated reflecting surface with fine roughness can be obtained. In FIG. 2, a primer layer is provided as the intermediate layer 5 in order to increase the adhesion between the layer 3 having irregularities and the substrate sheet 2. The intermediate layer 5 may be provided by a separate step before the layer 3 having irregularities is formed.

Figure 5:
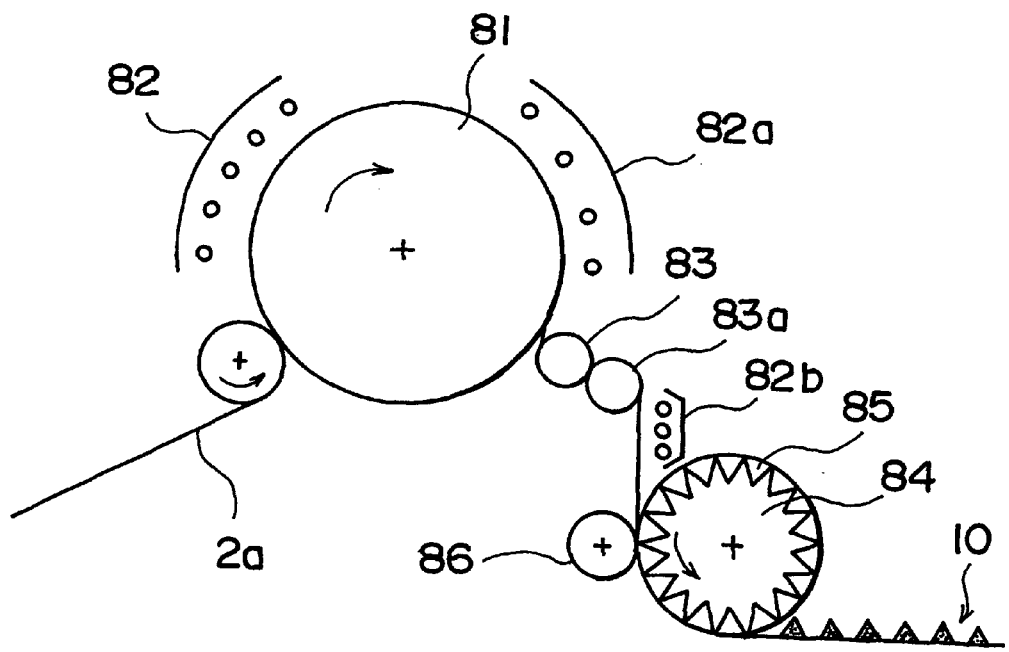
FIG. 5 is a diagrammatic view showing another example of an apparatus which can be used for producing a reflector of the present invention.
Figure 6:
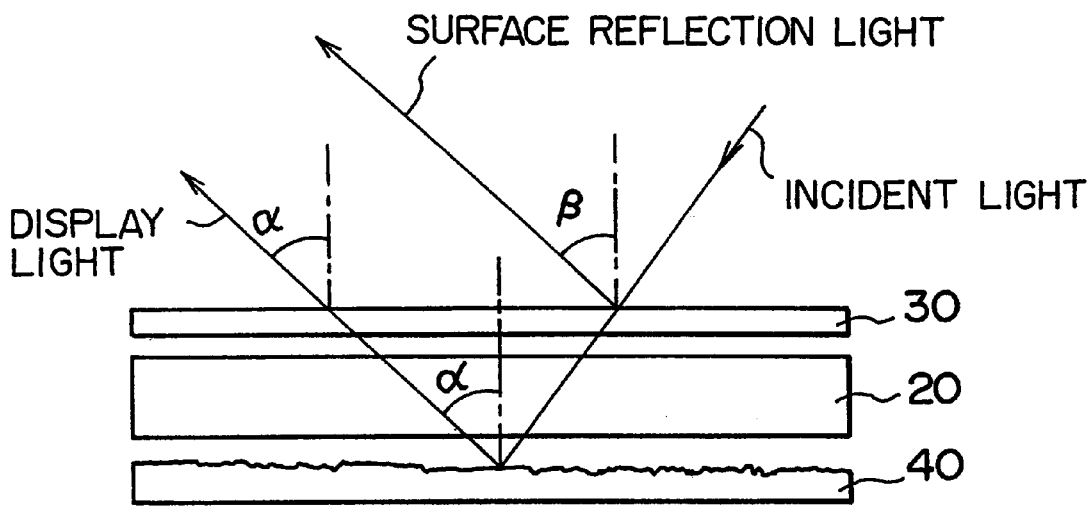
FIG. 6 is a view for explaining display light in a conventional reflector (matted reflector)
Figure 7:
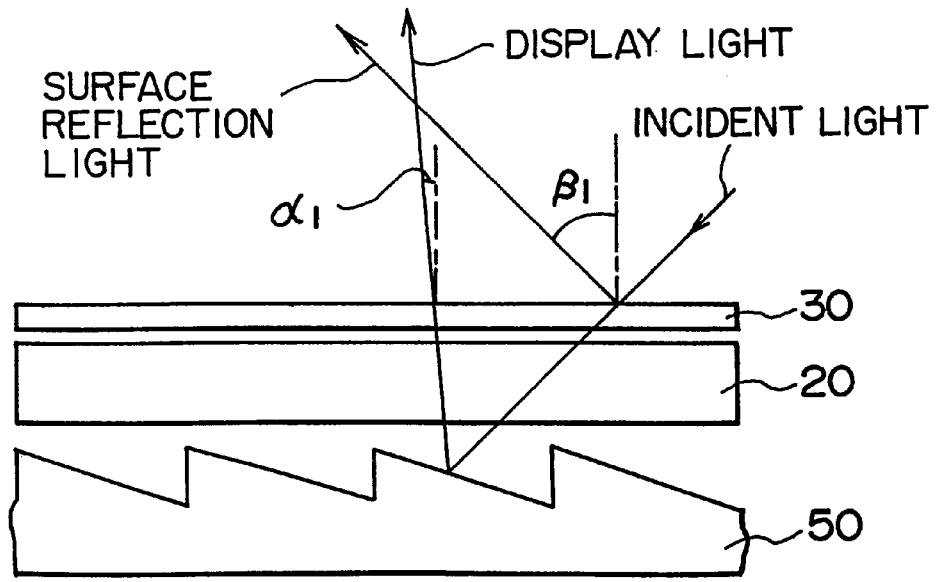
FIG. 7 is a view for explaining display light in a conventional reflector (serrated reflector)
Figure 8:
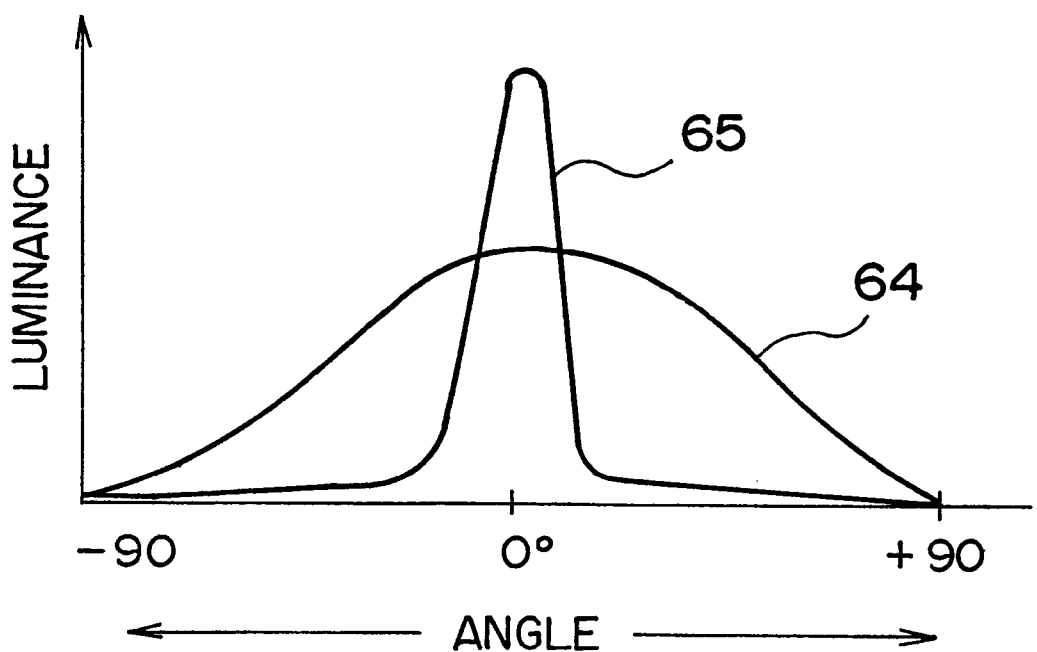
FIG. 8 is a conceptional view showing the luminance distribution characteristics of display light in conventional reflectors.

A reflector of the present invention can also be produced by embossing a sheet having a thermoplastic resin layer. FIG. 5 is diagrammatic view (side view) showing one example of an embossing machine which can be used for producing a reflector of the present invention.

In the apparatus shown in FIG. 5, the numeral 81 indicates a heating roll; the numerals 82, 82*a* and 82*b* indicate electric radiant heaters; the numerals 83 and 83*a* indicate heating jacket rollers; and the numeral 84 indicates an emboss roll which is provided with indentations 85 complementary to the irregularities to be formed on a reflecting surface and which rotates on an axis in the direction shown by an arrow. A press roll 86 is provided in order to bring a heated substrate sheet 2*a* into pressure contact with the emboss roll 84. The numeral 10 indicates a reflector.

By using the apparatus shown in FIG. 5, a single-layer reflector 10 can be obtained in the following manner: a substrate sheet 2*a* is thoroughly heated by the heating roll 81, the electric radiant heaters 82, 82*a* and 82*b*, and the jacket rollers 83 and 83*a*; and the heated substrate sheet is carried between the emboss roll 84 and the press roll 86, and thermally deformed there. Thus, a reflector 10 having a desired serrated surface with fine roughness can be obtained. In the case where the substrate sheet 2*a* is composed of a plurality of layers, the finally-obtainable reflector is of multi-layered.

Any material can be used as the substrate sheet, as long as it is a thermoplastic resin, when a reflector is produced by the above-described embossing technique. However, when embossing processability and the like are taken into consideration, it is preferable to use a vinyl chloride, acrylic, polycarbonate, polystyrene or polypropylene resin, or the like.

The product obtained by any of the above-described production methods can be used as it is as the reflector. It is however preferable to form, as a light-reflecting layer, a layer of a metal such as aluminum, chromium, gold or silver on the reflecting surface of the reflector by means of vacuum deposition, plating, or the like.

In the reflector of the present invention, the ridge line of the serration is, in general, linear. However, it can be made into any shape such as a circle or arc depending upon the position of an external light source and that of observation in terms of a display into which the reflector is incorporated.

The display element of a reflection-type display is not limited to a liquid crystal display element, and a signboard or the like using a transparent plastic board is also acceptable.

Figure 9:
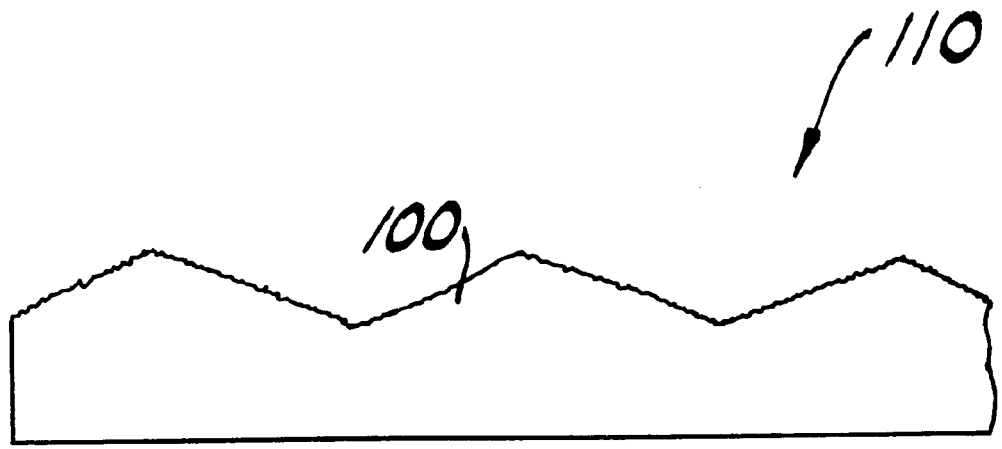
FIG. 9 is a second sectional view of an alternative embodiment of the invention showing a reflector (single-layer) having a series of isosceles triangles.
Figure 10:
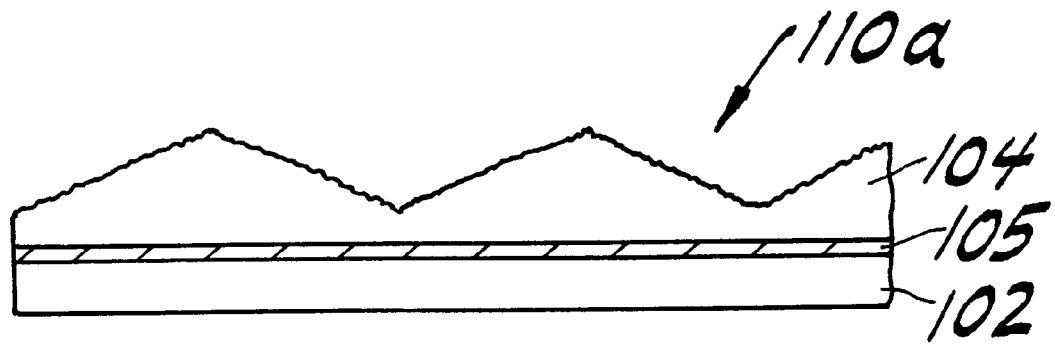
FIG.10 is a sectional view of an alternative embodiment of the invention (multi-layered) showing a reflector having a series of isosceles triangles.

FIGS. 9 and 10 show reflectors that are similar to the embodiments of FIGS. 1 and 2, respectively, but use a series of isosceles triangles. Referring to FIG. 9, a reflector 110 has a reflecting surface 100. The reflector 110a in FIG. 10 is a multi-layer design with layer 104 having isosceles triangles that make up the reflecting surface, an intermediate layer 105 similar to intermediate layer 5 in FIG. 2 and a substrate sheet 102 similar to substrate sheet 2 in FIG. 2.

EXAMPLE 1

A biaxially oriented polyethylene terephthalate film having a thickness of 50 micrometers ("A 4300" manufactured by Toyobo Co., Ltd., Japan, both surfaces thereof having been subjected to an adhesion-increasing treatment) was used as the substrate sheet. By using an apparatus as shown in FIG. 4, a primer [manufactured by The Inctec Co., Ltd., Japan, medium of varnish for chemical matte finish:XEL hardening agent (D)=10:1 (weight ratio)] was firstly gravure-coated onto one surface of the substrate sheet to form a primer layer. Subsequently, on the surface of this primer layer formed on the substrate sheet, an intermediate sheet with a layer having irregularities whose cross section was serrated, the shape of the serration being a right-angle scalene triangle, the serrated surface being finely roughened, was formed by using an ultraviolet-light-curable resin ("Z9002A" manufactured by Japan Synthetic Rubber Co., Ltd.). The pitch of the repeating serrations is 200 micrometers and the height of the serration is 26 micrometers. Ultraviolet light was applied by using two 160 W/cm2 lamps. Aluminum was then vacuum-deposited on the serrated surface to form a light-reflecting layer. Thus, a reflector of the present invention was obtained.

By using the reflector obtained and a liquid crystal display element in combination, a reflection-type display of the structure shown in FIG. 3 was fabricated. The display thus obtained was such that images displayed thereon were able to be observed without being obstructed by surface-reflected light. Moreover, the display was found to have a wide angle of view because, even when the angle of observation was changed, the images displayed were brightly observed.

EXAMPLE 2

A reflector having a serrated surface, the shape of the serration being a right-angle scalene triangle, was prepared in the same manner as in Example 1, provided that the fine roughness to be provided on the serrated surface was so adjusted that Ra would be 1.4 micrometers and that Rz would be 7.9 micrometers.

EXAMPLE 3

A reflector having a serrated surface, the shape of the serration being a right-angle scalene triangle, was prepared in the same manner as in Example 1, provided that the fine roughness to be provided on the serrated surface was so adjusted that Ra would be 1.0 micrometer and that Rz would be 5.4 micrometers.

Comparative Example 1

A reflector having a serrated surface, the shape of the serration being a right-angle scalene triangle, was prepared in the same manner as in Example 1, provided that the fine roughness to be provided on the serrated surface was so adjusted that Ra would be 0.6 micrometers and that Rz would be 3.9 micrometers.

Comparative Example 2

A reflector having a serrated surface, the shape of the serration being a right-angle scalene triangle, was prepared in the same manner as in Example 1, provided that the fine roughness to be provided on the serrated surface was so adjusted that Ra would be 2.1 micrometers and that Rz would be 12.4 micrometers.

It is noted that maximum reflectances and half-value angles were measured by a three-dimensional goniometer manufactured by Murakami Color Research Laboratory, Japan.

The results of the measurement of maximum reflectance and half-value angle carried out in terms of each sample are shown in Table 1.

TABLE 1

| | Ra ($\mu$m) | Rz ($\mu$m) | A (%) | B (*) |
|---|---|---|---|---|
| Example 2 | 1.4 | 7.9 | 16.8 | 41.0 |
| Example 3 | 1.0 | 5.4 | 33.7 | 27.7 |
| Comp. Ex. 1 | 0.6 | 3.9 | 88.6 | 14.8 |
| Comp. Ex. 2 | 2.1 | 12.4 | 8.7 | 55.0 |

A: maximum reflectance; B: half-value angle

By using the reflectors of the present invention, it is possible to obtain such reflection-type displays that images displayed thereon can be observed in a wide angle of view and also brightly observed without being obstructed by surface-reflected light.

What is claimed is:

1. A reflector for a display to be placed on a back surface of a reflection-type display, having a front reflecting surface with a triangularly serrated cross section, said reflecting surface having a roughness such that a center line average height Ra is 1 micrometer or more and 6 micrometers or less and that a ten-point average height Rz is 1 micrometer or more and 10 micrometers or less.

2. The reflector according to claim 1, wherein said triangularly serrated cross section comprises a series of isosceles triangles.

3. The reflector according to claim 1, wherein said triangularly serrated cross section comprises a series of scalene triangles.

4. A reflection-type display comprising:

a transparent display element; and a reflector disposed behind the display element and having a reflecting surface for reflecting incident light that has arrived at the reflector through the display element;

wherein said reflecting surface has a triangularly serrated cross section and a roughness having a center line average height Ra of from 1–6 micrometers and have a ten-point average height Rz of from 1 to 10 micrometers.

5. The reflection-type display according to claim 4, wherein said triangularly serrated cross section comprises a series of isosceles triangles.

6. The reflection-type display according to claim 4, wherein said triangularly serrated cross section comprises a series of scalene triangles.

* * * * *